Figure 1:
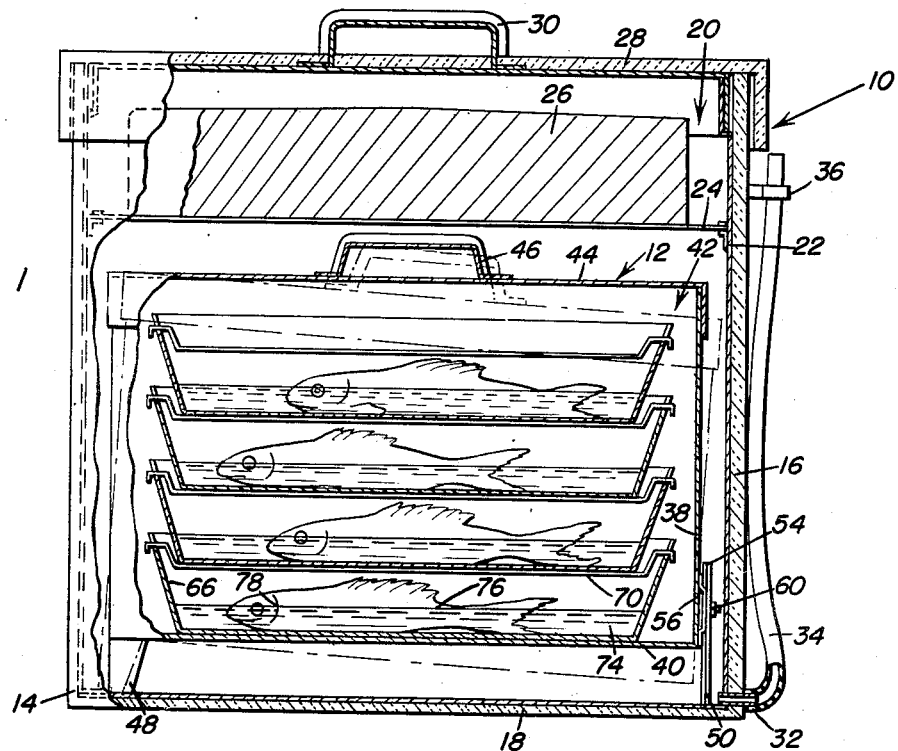

June 8, 1954 R. M. BROWN 2,680,424
METHOD FOR PRESERVING AND TRANSPORTING FISH
Filed April 24, 1953

Royce M. Brown
INVENTOR.

BY *Clarence A. O'Brien*
*and Harvey B. Jacobson*
Attorneys

UNITED STATES PATENT OFFICE 2,680,424

METHOD FOR PRESERVING AND TRANSPORTING FISH

Royce M. Brown, Albuquerque, N. Mex.

Application April 24, 1953, Serial No. 350,840

4 Claims. (Cl. 119—3)

The present invention relates to a method for maintaining fish in a live state during transportation or storage of the same and an apparatus for carrying out this method.

The present methods for transporting or storing live fish may be divided categorically into those utilizing portable aquariums, those utilizing containers with agitators for the water and those utilizing separate oxygen supplies to constantly rejuvenate the water. None of these methods are completely satisfactory because of excessive weight, high unit cost, and the necessity for constant care to mention a few of their disadvantages. It is significant that in all of these methods, complete immersion of the fish in the water and the freedom of movement of the fish are considered requisites to prevent death of the fish in addition to constant regeneration or rejuvenation of the water.

I have discovered a method whereby the aforementioned requisites may be disregarded without any ill effects on the fish.

The primary object of the present invention is to provide a method for transporting live fish that permits the transportation of a large number of fish in an exceedingly small space, that requires no agitation or aeration of the water in which the fish are placed and which requires very little water.

Another important object of the invention is to provide a method for the transportation and storage of live fish in water that requires no separate oxygen supply for the water and necessitates no water changes.

Other advantages of the instant invention will become apparent as the following description proceeds.

The method of the present invention in essence constitutes placing the fish in a small amount of water insufficient to completely immerse the fish whereby portions of the gills of the fish are exposed to the atmosphere above the water level.

The only requisites required by this method appear to be that the temperature be retained below 55° F. and above freezing and that the atmosphere above the water be moist for cold water fish. For warm water fish, the temperature should be maintained in a commensurately higher range.

Therefore, in carrying out my new method, the desired number of fish are placed in a container, sufficient water is added to the container to only partially immerse the fish leaving the upper portions or tips of the gills exposed and providing considerable air space above the water level within the container. The container is then covered to retain a moist atmosphere in the air space and placed in an insulating jacket to prevent excessive temperature variation.

With this method, movement of the fish is severely restricted since due to the shallowness of the water they lack traction. Also, the fish are in complete darkness; yet, they appear to be perfectly comfortable and suffer no loss of vitality.

In carrying out the method, sixty 4 inch trout were confined, ten to a container, in containers approximately 10 inches wide and 14 inches long with one quart of water per container. The containers were placed slightly out of level providing a gradual change in water depth. The fish would move head first into the shallower portions of the container where the tips of their gills were exposed above the water surface and would then lie there motionless for exceedingly long periods of time. These fish were kept in this manner for approximately three months without changing the water and only periodic feedings of the fish with no apparent ill effects on the fish.

On numerous occasions, other fish such as goldfish, suckers, sun fish, etc., have been confined in a like manner for periods exceeding 36 hours with no apparent ill effects.

Although I do not know why the fish thrive without ill effects under the conditions outlined above, a possible explanation may be as follows. All fish breath in substantially the same manner, the breathing organs comprising thin walled gills attached to a series of arches at the sides of the pharynx. Water is drawn in through the mouth of the fish and expelled through clefts between the arches aerating the blood in the thin walled gills. But, while the water is being drawn into the mouth of the fish, there is a momentary reverse flow through the gill openings. Therefore, some turbulence probably occurs at the clefts between the arches, which turbulence when coupled with the air space enveloping the upper portion of the gills, traps sufficient oxygen in the water used in the breathing process of the gill walls to aerate the blood passing within these gill walls.

If desired, in order to make sure of maintaining a moist atmosphere within the container, the water may be first added to the container and agitated within the container to wet the side walls thereof before placing the fish within the container and closing the top of the container. However, this is not absolutely necessary and may be used simply as a precautionary measure. Although the container need not be sealed by the lid forming the closure, as a practical matter the seal is advantageous to prevent inadvertent spillage which might occur during transportation otherwise.

Figure 2:
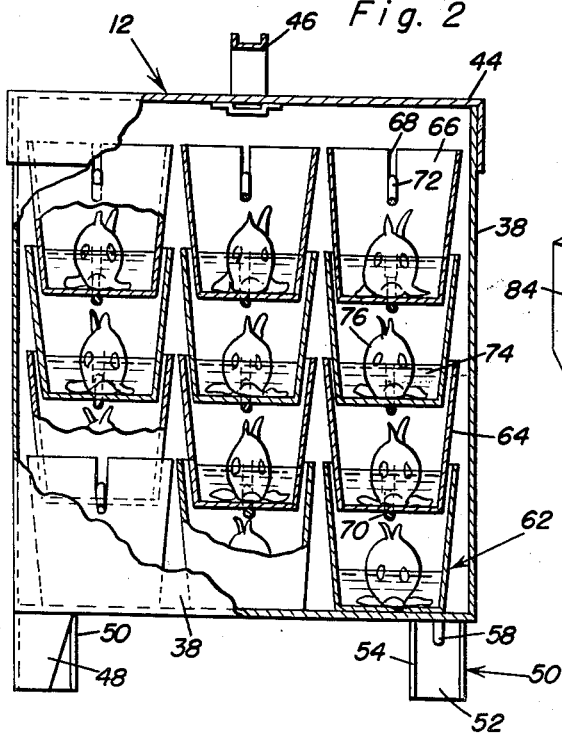
Figure 3:
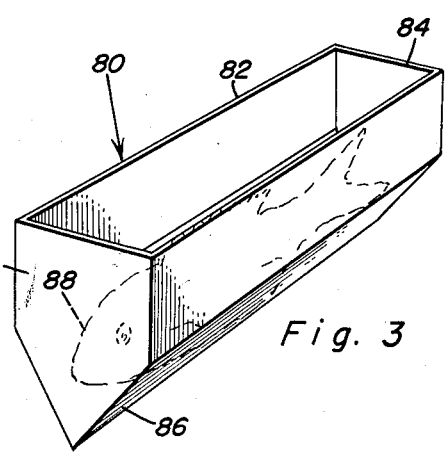

The apparatus that has been developed for carrying out the method described heretofore is set forth, in one form, in the drawings wherein:

Figure 1 discloses a side elevational view of the fish packed in a container and insulating jacket ready for shipment with parts being shown in cross section for clarity of detail;

Figure 2 is a front view similar to the side view of Figure 1 with parts being shown in cross section for clarity of detail; and Figure 3 is a perspective view of a modified form of pan for fish having bodies more elliptical than circular in cross section.

Referring now to the accompanying drawings in detail, wherein like reference numerals are utilized to designate similar parts throughout the various views, the numeral 10 designates generally the insulating jacket in which the fish container 12 is adapted to be housed.

The insulating jacket 10 comprises generally a housing 14 having side walls or a side wall 16, a bottom 18 and an open top 20. The housing may be, obviously, rectangular, oval or circular depending upon the desires of the user. Spaced circumferentially around the upper portion of the side wall 16 on the inner surface thereof are a plurality of brackets 22 for supporting a shelf 24. Ice 26 or some other cooling agent may be placed upon the shelf to retain the temperature within the housing 14 below 55° F. and above 32° F. A lid 28 closes the open top 20 of the housing 14 and handle 30 is provided on the lid for removing and replacing the same. On the side wall 16 adjacent the bottom 18 of the housing, a drainage spout 42 is provided for educting the water from the melted ice from the housing. A flexible hose 34 extends from and is connected to the drainage spout 32 and is normally held in a vertical position adjacent the side wall of the housing by means of the clip 36 secured to the outer surface at the upper portion of the side wall 16 of the housing.

The container 12, disposed within the housing 14 of the insulating jacket 10, may obviously take the shape of the insulating jacket 10. The container 12 is, in fact, substantially of the same general construction as the insulating jacket 10 constituting a side wall 38, a bottom wall 40, an open top 42 closed by a lid 44 having a handle to remove and replace the same 46 thereon.

However, the container 12 does distinguish from the insulating jacket 10 in one primary respect in that it is provided with a pair of legs 48 at what will hereinafter be referred to as the front of the container which are rigidly secured to the container and a pair of adjustable legs 50 at what will hereinafter be referred to as the rear of the container. The reason for the adjustable legs 50 at the rear of the container 12 is to permit the relative tilting of the container from the front to the rear for a purpose to become later apparent.

The adjustable rear legs 50 are shown as comprising channel strips having their webs 52 spaced from the side wall 38 of the container by the channel flanges 54. Brackets 56 mounted on the side wall 38 of the container 12 are disposed between the flanges 54 of each channel 50 to serve as guide means for the vertical adjustment of the legs or channels 50. The central portion of the web 52 of each channel 50 is longitudinally slotted as at 58 and fastener 60 projects from each bracket 56 through the slot 58 to retain each channel 50 in its adjusted position. By loosening the fastener 60, the rear of the container 12 may be tilted downwardly with respect to the front of the container to the position shown in dotted lines in Figure 1.

Within the container 12, are a plurality of pans 62. As shown, these pans are substantially flat bottomed having outwardly flared side and end walls 64 and 66 respectively. The central portion of the upper edge of each end wall 66 is notched at 68. A wire or rod member 70 extends between the ends 66 of each pan 62 and includes upturned, hooked end portions 72 which seat within the notches. With this arrangement, a plurality of the pans 62 may be stacked in vertical relation with respect to one another with the wires or rods 70 forming supports for the bottoms of the pans and the outwardly flared side and end walls 64 and 66, respectively of the pans serving to prevent wobbling of the stacked pans with respect to one another.

As shown in the preferred embodiment illustrated in Figures 1 and 2, each pan 62 is provided with sufficient water, indicated by the numeral 74 to partially immerse a fish 76 so that the upper portion or tip of the gills 78 of each fish are exposed to the air space above the water level.

Therefore, with this arrangement, it is obvious that a large number of fish may be transported in an apparatus of considerably little weight and requiring only small amounts of water.

It has been found through experience that the fish thrive somewhat better if the adjustable legs 50 are adjusted to provide a tilting or off-balancing position of the container whereby the depth of the water in each pan is gradually deepened from the front to the rear end of the pan. The reason for this is not clear since even with this tilted relationship, the fish will consistently point toward the front of each pan with the head and gills being disposed in the shallow portion of the pool and only the tail being disposed in the deeper portion of the pool formed by the water.

Obviously, many fish are not adapted to lie in flat bottomed pans such as 62 due to the peculiar shape of their bodies. Accordingly, for fish whose bodies are substantially oval in cross section, the pan shown in Figure 3 is provided.

Noting the pan in Figure 3 designated by the numeral 80, this pan is a substantially trough-shaped affair including side walls 82, end walls 84 and a substantially V-shaped bottom 86. The V-shaped bottom 86 permits an oval-shaped or "pancake" type fish to receive its support from the angular position of the bottom panels with respect to one another. A fish of such shape is shown in dotted outline in Figure 3 and is designated generally by the numeral 88.

To transport the pans 80 in the container 12, the pans are joined to one another in side by side relation with alternate stacked layers being crosswise with respect to one another.

From the foregoing description, the principles of the invention are believed to be readily apparent.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. The method of maintaining fish in a live, healthy condition during transportation comprising immersing the fish in water of a depth sufficient to only partially cover the gills of the fish, confining the fish against undue movement and surrounding the portion of the fish not covered with water with a moisture laden atmosphere.

2. The method of claim 1 wherein the temperature is maintained at a value not exceeding that of their natural habitat.

3. The method of claim 1 wherein the temperature is maintained in the range from 32°–60° F.

4. A process for maintaining fish in a live condition out of their natural habitat for purposes of storage and transportation comprising immersing the fish in a quantity of water sufficient to only partially immerse the fish with a portion of the gills of the fish being exposed to the atmosphere immediately above the water level, confining the fish against undue movement and maintaining the atmosphere surrounding the exposed portions of the gills in a substantially moisture saturated condition.

References Cited in the file of this patent

UNITED STATES PATENTS

| Number | Name | Date |
|---|---|---|
| 884,140 | Erlwein et al. | Apr. 7, 1908 |
| 1,552,063 | Kuehn | Sept. 1, 1925 |
| 2,316,607 | MacDonald | Apr. 13, 1943 |
| 2,652,807 | Washburn | Sept. 22, 1953 |